July 15, 1930.                    W. L. McGRATH                    1,770,419
                                COUPLING OR CLUTCH
                            Original Filed Nov. 22, 1920
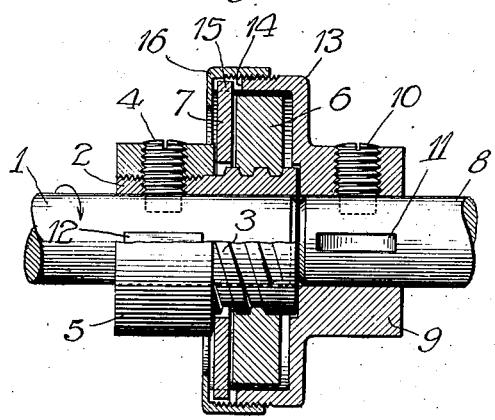
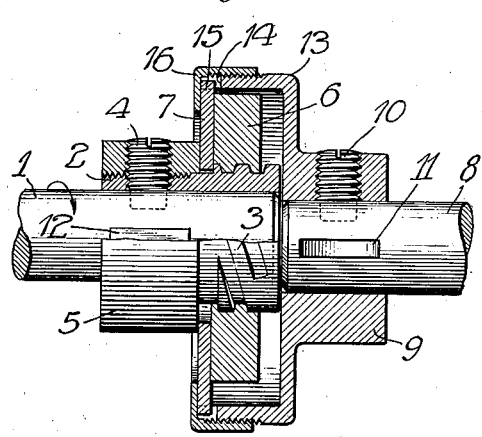
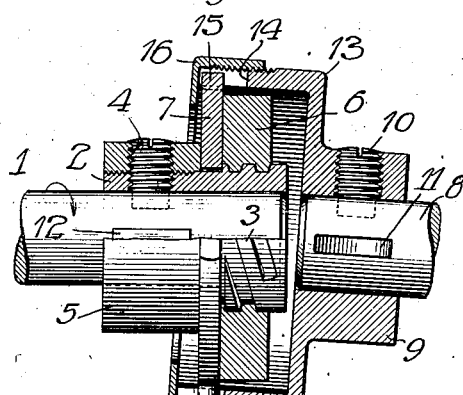
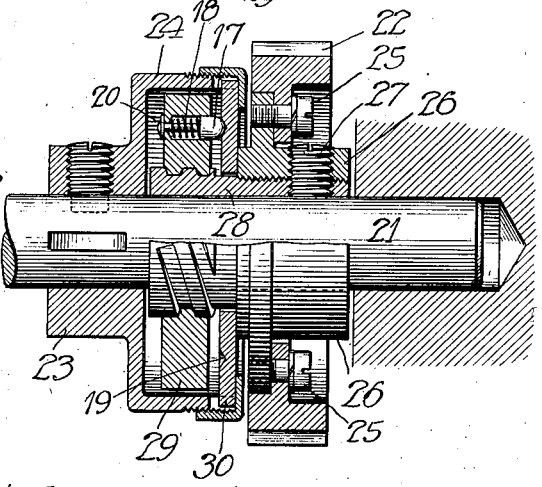
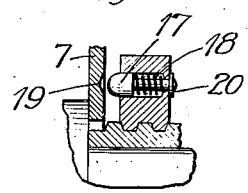

Patented July 15, 1930

1,770,419

UNITED STATES PATENT OFFICE

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK

COUPLING OR CLUTCH

Application filed November 22, 1920, Serial No. 425,715. Renewed February 8, 1926.

My invention relates to couplings or clutches for operatively connecting two rotatable members such as shafts and the object thereof is to provide a simple and efficient device of this character capable of driving in one direction only without employing any member in constant contact which would cause drag or friction when the parts are not in driving relation. This device is also so constructed as to be capable of taking care of different conditions of the shafts that is whether in axial alignment or displaced therefrom with the axis of one shaft displaced so as to be parallel to the axis of the other shaft, or displaced so that the axis of one shaft is at an angle to the axis of the other shaft. The construction and arrangement of my coupling is such that the shafts will be properly operatively connected together regardless of such displacement. Furthermore, the construction is such that accurate machine work is not required for proper functioning.

In the drawing, Fig. 1 is a sectional elevation of a coupling embodying my invention and shown applied to two shafts in axial alignment; Fig. 2 a similar view except that the shafts are not in axial alignment but one is displaced with respect to the other; Fig. 3 a similar view except that the axis of one shaft is shown at an angle to the other; Fig. 4 a sectional elevation of a modified form of construction and Fig. 5 a detailed section illustrating a means for assuring longitudinal travel of the nut on the screw sleeve.

Referring to the embodiment of my invention shown in Figs. 1, 2 and 3, the driving shaft 1 is provided either separately or integrally with a screw threaded portion which is here in the form of a separate screw sleeve 2, having screw threads 3 and secured to the shaft in suitable manner as by the set screw 4. This sleeve is provided with a collar portion 5 which is preferably separate from the sleeve and screw threaded thereon and held in place by the same screw 4.

A screw member, such as a nut 6, is threaded upon the sleeve 2 and mounted for longitudinal movement thereof and rotary movement therewith. A plate or disk 7 having a central opening is loosely mounted upon the sleeve and interposed between the nut 6 and the collar or head 5.

The driven shaft 8 is provided with a head 9 here shown as separate therefrom but secured thereto by the set screw 10 and key 11. This head 9 is provided with a cylindrical extension or shell 13 which encompasses the nut and disk and also is operatively connected with the disk by being interlocked therewith. To this end the disk and shell have tongue and slot connection, the slots in the shell being indicated at 14 and the tongues of the disk at 15. These slots are of greater depth than the width of the tongues with the result that there is provided some freedom or movement as respects the disk and the shell. The shell is held in place with respect to the disk by means of the ring 16 which is screw threaded upon the shell.

Describing the mode of operation and starting with the parts in the position shown in Fig. 1, the two shafts which are here in exact alignment are not now drivingly connected together but at the first rotation of the driving shaft the nut 6 will move automatically longitudinally to the left and will carry the disk 7 in the same direction until it is clamped securely against the right hand side of the collar 5 by the screw action of the nut. The disk is now drivingly connected for rotary movement with the driving shaft and inasmuch as this disk is at all times drivingly connected with the shell 13 and consequently with the driven shaft 8, the torque will be transmitted therethrough to such driven shaft. In the event that the shaft 8 should become the driving shaft the clutch connection would become automatically broken inasmuch as the nut 6 would thereupon automatically move toward the right and relieve the disk from said clamping action.

In Fig. 2 the driven shaft 8 is shown slightly displaced that is with its axis out of line with the axis of the driving shaft and to one side thereof. In Fig. 3 the axis of the driven shaft is shown displaced angularly with respect to the axis of the driving shaft but in either event the coupling remains operable inasmuch as there is sufficient freedom of movement as between the disk and shell to permit these displacements without interfering with the driving action.

If desired, the nut 6 may be provided with means for assuring its longitudinal movement, such as the means shown in Fig. 5 the same consisting of a pin or plunger 17 mounted transversely in a socket in the nut and held outwardly with a yielding pressure by a spring 18, in a direction toward the disk 7. If desired, this disk may be provided with one or more sockets 19 to increase the drag action between these two parts. The pin 17 is limited in its outward movement by the head 20 on its stem. When the nut in its longitudinal movement brings the pin 17 into contact with the disk 7 such nut will not rotate but longitudinal movement thereof and likewise the necessary screw action will be assured.

Referring to the modification shown in Fig. 4 the coupling is here between a shaft 21 and a wheel or gear 22 either one of which may be the driver. This shaft is provided with the head 23 having a shell 24. The gear is secured by the screws 25 to a hub 26 which in turn is secured by a set screw 27 to a screw sleeve 28 which is mounted loosely on shaft 21. A nut 29 similar to nut 6 is screw threaded on this sleeve and cooperates with the disk 30 in the same manner as hereinbefore described with respect to the disk 7. When the driving shaft 21 is rotated the nut 29 will move longitudinally to the right and clamp the disk 30 against the gear hub and thereby drivingly connect such shaft with the gear. The nut 29 so moves longitudinally because of its screw action on the shaft 28 resulting from its rotation through the medium of the pin 17.

It will be understood that the pin 17 may be applied to any of the forms illustrated and that where so used, either shaft may be the driving shaft. Also it is obvious that members other than shafts, such as gears, may be connected by my device, either with or without the intermediary of shafts.

It will be observed that my device has positive clutch action in one direction for the transmission of torque and that the clutching members are withdrawn physically from driving relation as an incident to and the result of rotation in the opposite direction when the driving member becomes the driven member, thereby avoiding friction or wear consequent on the parts called upon to do the driving so that the running of the device in such opposite or released direction does not diminish the effectiveness of the device.

I claim:

1. A coupling between two rotatable members comprising a driving device secured to one of the members, a connecting member mounted on said device, an actuating member mounted on said device for longitudinal movement thereof and for rotary movement therewith and adapted to co-operate with said connecting member to drivingly connect it with said device, and connecting means for drivingly connecting the other rotatable member with said connecting member and permitting an angular movement between said connecting member and said other rotatable member.

2. A coupling between two rotatable members comprising a driving member on one of the rotatable members, an actuating member mounted on the driving member for automatic longitudinal movement thereon and for rotary movement therewith, a plate loosely mounted on the driving member in the path of longitudinal movement of the actuating member and adapted to be clamped thereby against a part of the driving member for drivingly connecting it therewith, and connecting means for drivingly connecting the other of the two rotatable members with said plate for angular movement one with respect to the other.

3. A coupling between two rotatable members comprising a driving member on one of the rotatable members, a nut threaded on the driving member for longitudinal movement thereof and for rotary movement therewith, and a plate loosely mounted on such driving member in the path of longitudinal movement of the nut and adapted to be clamped thereby against a part of the driving member for drivingly connecting it therewith, said plate being drivingly connected with the other rotatable member for angular movement of the latter with respect thereto.

4. A coupling between two rotatable members comprising a driving sleeve secured to one rotatable member, a plate loosely mounted on the sleeve, a nut mounted on the sleeve for automatic longitudinal movement thereof and for rotary movement therewith and adapted to cooperate with the plate and drivingly connect it with the sleeve and a driven head secured to the other rotatable member and interlocked with the plate for rotary movement in unison therewith and for angular movement in relation thereto.

5. A coupling between two rotatable members comprising a driving sleeve secured to one rotatable member, a plate loosely mounted on the sleeve, a nut mounted on the sleeve for automatic longitudinal movement thereof and for rotary movement therewith and adapted to cooperate with the plate and drivingly connect it with the sleeve, and a driven head secured to the other rotatable member and having an extension which is interlocked with the periphery of the plate for rotary movement in unison therewith and for angular movement in relation thereto.

6. A coupling between two rotatable members comprising a driving sleeve secured to one rotatable member, a plate loosely mounted on the sleeve, a nut mounted on the sleeve for automatic longitudinal movement thereof and for rotary movement therewith and adapted to cooperate with the plate and drivingly connect it with the sleeve, and a driven head secured to the other rotatable member and having an extension which has a tongue and slot connection with the periphery of the plate for rotary movement in unison therewith and for angular movement with relation thereto.

7. A coupling between two rotatable members comprising a driving sleeve secured to one rotatable member, a plate loosely mounted on the sleeve, a nut mounted on the sleeve for automatic longitudinal movement thereof and for rotary movement therewith and adapted to cooperate with the plate and drivingly connect it with the sleeve, and a driven head secured to the other rotatable member and having an extension which is interlocked with the periphery of the plate for rotary movement in unison therewith and for angular movement with relation thereto, said extension being in the form of a shell which encloses said nut and plate.

8. A coupling between two shafts located end to end comprising a screw threaded sleeve secured to one of the shafts, a nut threaded on the sleeve for longitudinal movement thereof and rotary movement therewith, a plate loosely mounted on the sleeve and adapted to be drivingly connected therewith by being clamped between it and the nut when such nut is moved longitudinally in one direction on the sleeve, and a driven member secured to the other shaft and having a portion interlocked with the plate for rotary movement in unison therewith and for angular movement with relation thereto.

9. A coupling between two shafts located end to end comprising a screw threaded sleeve secured to one of the shafts, a nut threaded on the sleeve for longitudinal movement thereof and rotary movement therewith, a plate mounted on the sleeve and adapted to be drivingly connected therewith by being clamped between it and the nut when the nut is moved longitudinally in one direction on the sleeve, a driven member secured to the other shaft and having an extension with a tongue and slot connection with the plate for rotary movement in unison and for a limited longitudinal and angular movement one with respect to the other.

10. A coupling between two shafts located end to end comprising a screw threaded sleeve secured to one of the shafts, a nut threaded on the sleeve for longitudinal movement thereof and rotary movement therewith, a plate mounted on the sleeve and adapted to be drivingly connected therewith by being clamped between it and the nut when such nut is moved longitudinally in one direction on the sleeve, and a driven head secured to the other shaft and having an extension with a tongue and slot connection with the plate for rotary movement in unison and for limited longitudinal and angular movement one with respect to the other, said extension being in the form of a shell provided with a removable ring cooperating with the plate and extension to maintain the connection between them.

11. A coupling between two shafts located end to end comprising a screw threaded sleeve secured to one of the shafts, a nut threaded on the sleeve for longitudinal movement thereof and rotary movement therewith, a plate mounted on the sleeve and adapted to be drivingly connected therewith by being clamped between it and the nut when such nut is moved longitudinally in one direction on the sleeve, and a driven head secured to the other shaft and drivingly connected with said plate for rotation in unison therewith and for angular movement with respect thereto for accommodation of angular movement between the two shafts and for displacement axially of one with respect to the other.

12. A coupling between two shafts located end to end comprising a screw threaded sleeve secured to one of the shafts, a nut threaded on the sleeve for longitudinal movement thereof and rotary movement therewith, a plate loosely mounted on the sleeve and adapted to be drivingly connected therewith by being clamped between it and the nut when such nut is moved longitudinally in one direction on the sleeve, means for assuring longitudinal movement of the nut when the sleeve is rotated to thereby cause screw action against the plate, and a driven head secured to the other shaft and having a tongue and slot connection with said plate.

13. A coupling between two shafts located end to end comprising a screw threaded sleeve secured to one of the shafts, a nut threaded on the sleeve for longitudinal movement thereof and rotary movement therewith, a plate loosely mounted on the sleeve and adapted to be drivingly connected therewith by being clamped between it and the nut when such nut is moved longitudinally in one direction on the sleeve, a yielding device located between the nut and the plate to produce a drag on the nut to cause screw action thereof against the plate, and a driven head secured to the other shaft and interlocked with said plate for rotation in unison therewith and for angular movement with relation thereto.

14. A coupling between two shafts located end to end comprising a screw threaded sleeve secured to one of the shafts, a nut threaded on the sleeve for longitudinal movement thereof and rotary movement therewith, a plate loosely mounted on the sleeve and adapted to be drivingly connected therewith by being clamped between it and the nut when the nut is moved longitudinally in one direction on the sleeve, a spring pressed pin mounted in the nut and adapted to contact the plate to assure longitudinal travel of such nut and consequent screw action against the plate, and a driven head secured to the other shaft and drivingly connected with said plate.

15. A coupling between two shafts located end to end, one of said shafts being screw threaded at its said end, a nut threaded on said screw threaded portion for longitudinal movement thereof and rotary movement therewith, a plate losely mounted at the end of said screw threaded portion and adapted to be drivingly connected with said particular shaft by being clamped between it and the nut when such nut is moved longitudinally against it, a driven head having an extension in the form of a shell enclosing said nut and plate and interlocked with said plate for driving purposes.

16. A coupling between two shafts located end to end, one of said shafts being screw threaded at its said end, a nut threaded on said screw threaded portion for longitudinal movement thereof and rotary movement therewith, a plate loosely mounted at the end of said screw threaded portion and adapted to be drivingly connected with said particular shaft by being clamped between it and the nut when such nut is moved longitudinally against it, a driven head having an extension in the form of a shell enclosing said nut and plate and having tongue and groove connection with such plate, and a flanged ring engaging said extension and partially enclosing said plate by its flange.

17. A coupling between two rotatable members which are arranged in axial alinement and in tandem relation, which coupling comprises a driving device on the first of said members, a connecting member, connecting means for drivingly connecting the second rotatable member with said connecting member, said connecting member and said connecting means being capable of angular movement one with respect to the other in the plane of the axis of rotation of said rotatable members, and an element actuated by said device and adapted to longitudinally shift and thereby place said connecting member into driving relation with said first member when such latter member is rotated.

18. A coupling between two rotatable members which are arranged in axial alinement and in tandem relation, which coupling comprises a driving device on the first of said members, in the form of screw threads upon such member, a loosely mounted plate through whose center such device passes, a nut threaded on said device adapted to cooperate with the plate and drivingly connect it with said first rotatable member, and connecting means between said second one of the rotatable members and said plate, said connecting means and said plate being capable of angular movement one with respect to the other.

19. A coupling between two rotatable members which are arranged in axial alinement and in tandem relation, which coupling comprises a friction member on the first of such two rotatable members, a second friction member cooperating with the other friction member and loosely mounted with respect to said first one of the two rotatable members, said second friction member being drivingly connected with the second one of the two rotatable members, and means for clamping said two friction members together to establish driving relation between the two rotatable members.

20. A coupling between two shafts located end to end, the first of said shafts having a screw threaded portion at such end, a nut threaded on said portion, a plate encircling and loosely mounted upon the first shaft and adapted to be drivingly connected with such first shaft by being clamped thereagainst by the nut when the nut is screwed longitudinally against it, and means for drivingly connecting such plate with the second of said shafts.

21. A coupling between two shafts located end to end, the first of said shafts having a screw threaded portion at such end, a nut threaded on said portion, a plate encircling and loosely mounted upon the first shaft and adapted to be drivingly connected with such first shaft by being clamped thereagainst by the nut when the nut is screwed longitudinally against it, and a shell secured to the second of said shafts and to the plate.

22. A coupling between two shafts located end to end, the first of said shafts having a screw threaded portion at such end, a nut threaded on said portion, a plate encircling and loosely mounted upon the first shaft and adapted to be drivingly connected with such first shaft by being clamped thereagainst by the nut when the nut is screwed longitudinally against it, and a shell secured rigidly to the second of said shafts and loosely to the plate.

WILLIAM L. McGRATH.